Patented Nov. 29, 1932

1,889,654

UNITED STATES PATENT OFFICE

ROBERT GRIESSBACH, OF LUDWIGSHAFEN-ON-THE-RHINE, AND HANS WEISS, OF MANNHEIM, GERMANY, ASSIGNORS, BY MESNE ASSIGNMENTS, TO THE OHIO SANITARY ENGINEERING CORPORATION, OF COLUMBUS, OHIO, A CORPORATION OF OHIO

FERTILIZER

No Drawing. Application filed December 20, 1928, Serial No. 327,469, and in Germany January 14, 1928.

The present invention relates to fertilizers consisting of or containing compounds of phosphoric acid with silica. It is already known in the production of complex silico-phosphoric acids that the operation may be commenced with a solution of silica in phosphoric acid. This method requires, in addition to a large amount of phosphoric acid, a specially prepared silica. Moreover, products which contain water, for example a compound $SiO_2.2P_2O_5.4H_2O$, are unstable and instantaneously decompose with water into silicic acid and phosphoric acid.

We have now found that, by heating solid siliceous substances together with an amount of phosphoric acid, corresponding to from 1½ to 8 times the weight of silica present, to a temperature above 250° centigrade, a product is obtained which, by virtue of its property of only slowly decomposing into water-soluble phosphoric acid and active silica in the soil, is adapted to serve as a gradually acting fertilizer, which continues to act during a long period. According to this process, silica of any origin, as for example quartz, can be converted into the desired compound even by using merely an amount of phosphoric acid which corresponds approximately to the equimolecular proportion of $SiO_2$ to $H_3PO_4$, the final product corresponding to the formula $SiO_2.P_2O_5$. Any excess of phosphoric acid which may be present in the product can be readily eliminated by washing with water. The resulting fertilizer may be employed alone or mixed with other fertilizers, such as urea, or calcium or ammonium phosphates, ammonium sulphate and the like or mixtures thereof.

It is also possible according to this invention by the selection of suitable working temperatures, to obtain products which differ in their stability in the presence of water, and therefore differ in their rapidity of action when used as fertilizers. The higher the reaction temperature is chosen, the less is the velocity of decomposition of the products in their use.

The fertilizing value of the products obtained by heating siliceous materials and phosphoric acid in the aforedescribed manner can be further improved by treating a reaction mass obtained in accordance with the aforedescribed process and containing still free phosphoric acid with ammonia. The products so obtained are capable of being stored without caking and exhibit a neutral reaction. By suitable variation of the quantities of the single components, products may be obtained in which the proportion of nitrogen, phosphoric acid and silica are widely different, and also in this case other fertilizers may further be added, if desired.

The following examples will further illustrate the nature of the said invention which however is not limited thereto.

Example 1

10 kilograms of finely ground river sand are intimately stirred with 50 kilograms of a 60 per cent phosphoric acid at ordinary temperature, and are then heated in a muffle furnace to about 250° centigrade, at which temperature the mixture is maintained for about two hours. After cooling, the mass, which is in the condition of a solid block, is finely ground, and can as such be employed as a fertilizer.

Example 2

River sand, mixed with phosphoric acid as in Example 1, is heated to 600° centigrade and kept at that temperature for about 2 hours, the product being finely ground when cooled.

The products prepared as in Examples 1 and 2 are stored, under equal conditions, in water. The product obtained in accordance with Example 1 becomes completely decomposed into phosphoric acid and silica in 5 days, whereas the decomposition of the product obtained according to Example 2 is not complete until 70 days have elapsed.

Example 3

100 kilograms of finely ground river sand are intimately mixed at ordinary temperature with 300 kilograms of a 70 per cent phosphoric acid by stirring, and the whole is then heated at 350° centigrade in a muffle furnace until no more water vapor is evolved. After cooling, the mass is comminuted into coarse granules and treated to saturation with ammonia gas. The product is then finely ground and is then adapted for direct employment as a fertilizer.

What we claim is:

1. The process for the production of fertilizers which comprises heating a solid siliceous material with an amount of phosphoric acid, calculated on acid of 60 per cent strength, corresponding to from 1½ to 8 times the weight of silica present to a temperature above 250° centigrade and treating the product obtained, after cooling, with ammonia.

2. The process for the production of fertilizers which comprises heating finely ground sand with 3 times its weight of a concentrated phosphoric acid calculated on acid of 60 per cent strength at about 350° centigrade until water is practically completely removed, cooling, then comminuting the mass and treating it with gaseous ammonia.

In testimony whereof we have hereunto set our hands.

ROBERT GRIESSBACH.
HANS WEISS.